United States Patent
Prairie et al.

[11] Patent Number: 6,116,172
[45] Date of Patent: Sep. 12, 2000

[54] SHANK-MOUNTED ROW CHOP OPENER

[75] Inventors: Douglas Samuel Prairie; Bradley John Meyer; Timothy Allen Murray, all of Fargo, N. Dak.

[73] Assignee: Case Corporation, Racine, Wis.

[21] Appl. No.: 09/178,143

[22] Filed: Oct. 23, 1998

[51] Int. Cl.[7] ........................................ A01C 5/00
[52] U.S. Cl. ..................... 111/154; 111/903; 111/188; 111/123; 111/18; 111/924
[58] Field of Search ..................... 111/903, 200, 111/186, 189, 187, 188, 154, 156, 924, 123, 124, 125, 129, 14, 18, 152; 172/747, 720, 721, 733

[56] References Cited

U.S. PATENT DOCUMENTS

| | | | |
|---|---|---|---|
| 3,355,102 | 11/1967 | Gregory, Jr. | 111/903 X |
| 3,422,776 | 1/1969 | Gregory, Jr. | 111/903 X |
| 3,927,400 | 12/1975 | Knepler | 111/903 X |
| 4,238,790 | 12/1980 | Balogh et al. | 111/903 X |
| 4,388,878 | 6/1983 | Demzin | 111/186 |
| 4,770,112 | 9/1988 | Neumeyer | 111/186 X |
| 5,136,954 | 8/1992 | Fetaz et al. | 111/186 X |
| 5,301,848 | 4/1994 | Conrad et al. | 111/903 X |
| 5,325,799 | 7/1994 | Rowlett | 111/152 |
| 5,425,318 | 6/1995 | Keeton | 111/189 X |
| 5,533,458 | 7/1996 | Bergland et al. | 111/903 X |
| 5,562,054 | 10/1996 | Ryan | 111/186 X |
| 5,598,795 | 2/1997 | House | 111/186 |
| 5,640,915 | 6/1997 | Schaffert . | |
| 5,673,638 | 10/1997 | Keeton | 111/167 |
| 5,730,074 | 3/1998 | Peter | 111/189 X |
| 5,906,166 | 5/1999 | Wagner | 111/186 X |
| 5,918,557 | 7/1999 | Schaffert . | |

*Primary Examiner*—Victor Batson
*Attorney, Agent, or Firm*—Mayer, Brown & Platt

[57] ABSTRACT

A shank-mounted opener assembly connected to a seed distribution system is provided for both till and no-till operations. The opener assembly includes a spike member that is supported on the shank, a firming point, a seed sensor connected to the seed supply, a seed boot, a seed locking mechanism, and a multi media delivery tube assembly. The seed boot encloses the seed sensor and includes a pair of lateral side walls. The seed boot protects the seed sensor from moving soil and debris. The seed locking mechanism pushes the seed into the soil and forms a shallow layer of soil over the seed dispensed through the seed sensor. If desired, assistive media can be dispensed into the furrow at the same time as seeding. The assistive media are dispensed through the multi-media delivery tube assembly. The assistive media are not dispensed to the furrow until after the seed locking mechanism covers the seed with a shallow layer of soil.

20 Claims, 3 Drawing Sheets

SHANK-MOUNTED ROW CHOP OPENER

BACKGROUND OF THE INVENTION

1. Field of the Invention

The present invention relates to ground engaging tools, also known as opener assemblies, for agricultural drill systems. In particular, the present invention relates to opener assemblies that can be used under till and no-till conditions. The opener assembly is mounted on a shank that extends from the frame of the drill system. As the drill system is conveyed by a tractor or other off-road vehicle, the opener assembly is lowered to engage the ground and forms a furrow in the ground into which seed and other media are placed. In order to form the planting furrow and to seed in one pass, the opener assembly is in communication with a seed and other media distribution system that provides a metered flow of seeds and other media to the opener assembly.

2. Description of Related Art

Efficient and economic use of resources is a critical concern of farmers during planting season. The optimal time period or window for planting is limited and sometimes is as brief as a few days. If planting is done outside of this window, yields may be adversely affected. Though time is always of the essence, the quality of seed and material handling must be maintained to provide desirable rates of germination and plant growth.

Flexible equipment assists the farmer in making the best use of time and other resources. With limited time frames for optimal planting conditions, a farmer routinely wants to minimize equipment down time that occurs, for example, when equipment must be changed to accommodate different crops and field conditions. Down time is minimized when the farmer can use equipment that is flexible so as to handle multiple seed types and a wide range of field conditions.

Depending on the crop, the soil, planting practices and weather conditions, a farmer may choose to till or not to till a field before planting it. For example, the farmer may need to incorporate chemicals, dry out the soil, or remove weeds. Turning over and tilling the soil will create warmer soil conditions for the seed, while soil that is not tilled will be cooler in temperature. If the field is to be tilled, it may be desirable to use a drill system that can till and plant in one pass. The planting portion of the process, including forming the furrow or trench into which the seed is deposited, is done by what is known in the art as a ground engaging tool or an opener. Historically, those engaged in agricultural operations located in different regions of the country have grown accustom to using particular types of opener assemblies for planting particular types of crops.

For example, disc openers are flat and round and have a sharp blade edge for cutting through the ground. Disc openers are pulled through the ground and, as they rotate like wheels across the ground, they cut a furrow or trench into which seed can be deposited. Disc openers have conventionally been used to plant row crops, like corn. Row crops include corn, sunflower, and some varieties of soybean; row crops are typically characterized as those crops where the rows of seed are spaced apart by some distance, for example 15 inches or more. Though typically used for row crops, disc openers can also be used for solid seeding. Solid seeding is usually performed for cereal crops and results in a seed pattern that is ribbon-like such that the seeds are dropped closely together. Solid seed crops maximize the surface area usage of soil because they do not have "dead space" between rows as occurs with row crops. Solid seeding is generally understood by farmers to describe any seed pattern where the "rows" are spaced less than 15 inches apart. There also are grain drills for wheat and other cereal crops that are comprised of discs spaced as little as six inches apart; however, there are physical limitations on how closely discs can be located next to each other. While disc openers typically have good seed depth control, they are not rugged in terms of being able to handle mud and trash, such as rocks, sticks, and organic matter from the previous crop in the field and they require more maintenance.

The alternative to a disc opener is an opener assembly that is mounted on a shank. Shank mounted openers are more flexible than disc openers in terms of the soil conditions that they are able to handle. For example, shank mounted openers can handle more mud and trash flow than disc openers. Further, they require less maintenance for operation. Shank mounted openers can be used with both till and no-till planting. The combination of a shank seeder with a sweep allows one pass tilling and planting.

After the trench has been formed by either a disc or shank mounted opener and prepared for seed growth, the assembly must provide for delivery of the seed to the trench. This is typically performed by a seed boot, of which numerous configurations are known. Regardless of the design used, the objective of the seed boot is to provide a location where the seed can be delivered to the trench. Accuracy and control of the rate of seed delivery is checked with seed sensors that are mounted high enough on the seed boot to be protected from soil and debris. Some known opener assemblies further include a media delivery tube for dispensing beneficial media, including fertilizers, into the trench at the same time that the seed is planted.

Though a variety of opener assemblies are known, there remains a need for an opener having improved versatility and lower maintenance needs. Further, there remains a need for an opener assembly that provides for an improved seed environment. The configurations of currently available opener assemblies may be limited to dispensing only one beneficial medium to assist the germination and growth of the seeds. Therefore, there remains a need for an opener assembly in which the seed sensor can more accurately measure the rate of seed delivery without damage to the seed or the sensor and in which more than one beneficial medium can be delivered into the trench at the same time the seeds are planted.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus and method particularly pointed out in the appended claims.

The present invention is directed to an opener assembly that is connected to a seed distribution system that is conveyed across an area of ground by an off-road vehicle. The opener assembly can be used with any type of drill system that uses shanks to seed and can be used in conjunction with both till and no-till planting. The opener assembly includes a spike member, a seed boot, and a firming point. The spike member has a pointed front end for opening a trench or furrow in the ground. The spike member is supported on a mounting device, such as a shank that is connected to the frame of the drill system. The drill system is conveyed by the vehicle for engagement with the ground so as to form the furrow. The seed boot dispenses the seeds into the furrow and is in communication with a seed distribution system that regulates the flow rate of seeds. The firming point, which advantageously prevents soil from falling back into the furrow in the wake of the spike member, is positioned between the spike member and the seed boot. In order to protect the seed sensor and improve the accuracy with which the seed is dispensed into the furrow, a seed boot is used as a housing. Though the seed boot can have a variety of useful configurations, in a preferred embodiment the seed boot includes at least a pair of lateral side walls.

In addition to providing protection to the seed sensor, the seed boot provides the additional benefit of acting as a mount for other components of the opener assembly. For example, the firming point can be mounted on the leading end of the seed boot so as to be positioned between the spike member and the seed boot. With some applications it is desirable to have a seed sensor to measure the flow rate of seeds through the seed boot. The seed sensor can provide the most accurate information when it is positioned near the outlet of the seed boot. With conventional shank mounted opener assemblies this is not feasible because the seed sensor would be easily damaged or even destroyed by dirt and debris being circulated in the wake of the spike member. However, in the present invention, the seed boot encloses a seed sensor device positioned close to the seed boot outlet.

The opener assembly of the invention can also have one or more sweeps connected to be in contact with the soil. The sweeps allow the opener assembly to till all of the soil during the planting operation. The sweep can also be used to dispense chemicals, fertilizer and other media to the furrow and surrounding area. Sweeps have a variety of widths and shapes depending on the type of tillage desired. The lower end of the sweep is typically slightly above the firming point to allow for a proper furrow for seed placement. However, the sweep can be mounted at various heights in relation to the firming point and the spike member, depending on the tillage depth required. Sweeps can be mounted with bolts to both sides of the opener assembly. In order to adjust the height of the sweep, a series of holes into which the bolts fit can be provided. Usually, the sweep is positioned between the spike member and the seed boot of the opener assembly.

The opener assembly of the invention can further include a seed locking mechanism fastened to the portion of the housing trailing the seed boot. The seed locking mechanism pushes the seed into the bottom of the furrow to increase seed to soil contact. The seed locking mechanism also follows the seed boot to urge a shallow layer of soil back over the seed that has just been dispensed into the furrow. Additionally, the seed locking mechanism forms a layer of soil between the seed and any assistive media that may be dispensed into the furrow to promote germination and plant growth.

In order to simultaneously dispense assistive media in the same equipment pass, the opener assembly can have a media delivery tube fastened to the seed boot such that the media is dispensed subsequent to the seed locking mechanism passing through the furrow. The media delivery tube is in communication with a storage bin that is conveyed along with the seed distribution system. If more than one medium is to be dispensed into the furrow and the media are compatible, both media source bins can feed into a common media delivery tube. However, if more than one medium is to be dispensed into the furrow and the media are not compatible, the opener assembly can include a number of media delivery tubes fastened to the seed boot with each media delivery tube being in communication with a separate storage bin. The media delivery tubes can dispense either dry or liquid particulates into the furrow.

In accordance with another aspect of the invention, the opener assembly of the invention includes a spike member, a seed sensor, and a seed boot. As previously described, the spike member is configured to have a sharp front end portion capable of cutting through even dry or hard soil to form a furrow. The spike member is mounted to a shank or similar mounting device connected to the frame of the drill system. In operation, the spike member is engaged with the ground so as to form a furrow. The seed sensor is in communication with a seed distribution system and has an open lower distal end from which seed is dispensed into the furrow. The seed boot encloses the open lower distal end of the seed sensor. The opener assembly can further comprise a firming point for preventing the collapse of soil back into the furrow in the wake of the spike member. Further, the firming point cleans out any material which may have fallen into the furrow and the firming point creates a "V"-shaped furrow for better seed to soil contact. In order to keep the furrow free of soil and to maintain the desired depth of the furrow, the firming point is mounted to the leading end of the seed boot. After seed is dispensed into the furrow it may be desirable to have a small amount of soil returned into the furrow to cover the seed and separate it from assistive media that may be applied. For those applications, the opener assembly also has a seed locking mechanism fastened to the seed boot in such a way that it urges a layer of soil over the seed dispensed into the furrow.

In order to apply the assistive media, the opener assembly can have one or more media delivery tubes. Compatible assistive media can also be applied through a common media delivery tube. The media delivery tube is fastened to the seed boot in such a way that the media is dispensed after the seed locking mechanism urges a layer of soil over the seed dispensed into the furrow. The media delivery tube is connected to one or more storage bins that are part of the drill system that is conveyed by an off-road vehicle. Additionally, if desired, for tilling of the soil during the planting operation, one or more sweeps may be added to the sides of the opener assembly. The sweep can also be used to dispense chemicals, fertilizer and other media into the furrow or the area surrounding the furrow. Sweeps are available in a variety of widths and shapes depending on the desired usage. The sweep is placed between the spike member and the seed boot. Typically, the sweep is located so that the bottom edge of the sweep is slightly above the firming point. However, the sweep can be mounted at one or more heights in relation to the firming point or the spike member depending on the desired depth of tillage required for the application.

In order to fulfill the described needs in the art, the opener assembly of the invention may also include the combination of a spike member, a seed boot, a seed sensor, a seed locking mechanism, and a multi-media delivery tube assembly. The spike member is at the front of the opener assembly and is mounted to a shank extending from the frame of the drill system in such a way that the spike member can be pulled through the soil to form a furrow into which seed can be dispensed. The spike member is mounted at a height that will provide the desired furrow depth. The seed boot is positioned behind the spike member and protects the seed as it is dispensed into the furrow formed by the spike member. The seed sensor has an open lower distal end from which the seed is dispensed through the seed boot. In order to protect and to control the trajectory of dispensed seed, the seed sensor is enclosed within the seed boot. In one embodiment, the seed boot has a pair of lateral side walls.

The opener assembly further includes a seed locking mechanism fastened to the seed boot such that the seed locking mechanism urges soil back into the furrow to at least partially cover the dispensed seed. The seed locking mechanism also pushes the seed into the bottom of the furrow to increase seed to soil contact in addition to collapsing the trench. The seed locking mechanism follows the seed boot and its height can be adjusted to vary the amount of soil urged into the furrow and the amount of pressure on the seed. The benefit of partially refilling the furrow after seed has been dispensed into it is to provide a buffering layer of soil between the seed and any particulate media that may be applied to the furrow. In order to apply assistive media such as fertilizer and other nutrients or pesticides and herbicides, the opener assembly includes a multi-media delivery tube assembly. The multi-media delivery tube assembly is fastened to the seed boot so as to dispense dry or liquid particles after the seed locking mechanism has covered the seed with a layer of soil. The multi-media delivery tube assembly is connected to one or more storage bins that contain a supply of the dry or liquid assistive media.

If desired, the opener assembly has a firming point to prevent soil from falling into the furrow and to clean out the furrow in the wake of the spike member. The firming point clears a "V"-shaped furrow that helps improve seed to soil contact. If used, the firming point is mounted on the seed boot behind the spike member. Additionally, if desired, one or more sweeps can be mounted to the sides of the opener assembly to till the soil during the planting operation. The sweep can also be used to dispense chemicals, fertilizer or other media into the furrow and the area surrounding the furrow. Sweeps are available in a variety of widths and shapes depending on the type of tillage required. The sweep is mounted with bolts or a similar device so that it can be easily removed if tillage is not necessary. The sweep is positioned on the opener assembly so that the bottom edge of the sweep is located slightly above the firming point or the spike member. This position permits the furrow to be maintained for seed placement. Additionally, the height of the sweep in relation to firming point or spike member can be adjusted by providing a series of vertical holes into which the bolts can be inserted for mounting. By varying the height of the sweep, different depths of tillage can be achieved. Typically, the sweep is mounted between the spike member and the seed boot.

The described embodiments provide several advantages over the prior art. Incorporation of a firming point into the opener assembly stabilizes the furrow formed by the spike member and prevents soil from refilling the furrow. The opener assemblies of the invention also provide the benefit of protected seed sensors by incorporating a seed boot that encloses the seed sensor. The seed boot protects the seed sensor from damage and contamination as well as deflecting dispensed seeds back into the furrow. The multi-media delivery tube assembly permits single equipment pass application of more than one assistive media. This aspect of the opener assembly is especially beneficial when the various media can not be premixed and dispensed from one storage source. Attachment of one or more sweeps to the opener assembly of the invention allows for planting in either tilled or no-till conditions. Variable height attachment of the sweep to the opener assembly provides for a range of tillage depths.

It is to be understood that both the foregoing general description and the following detailed description are exemplary and provided for purposes of explanation only, and are not restrictive of the invention, as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

Reference will now be made in detail to the present preferred embodiment of the opener assembly of the invention, examples of which are illustrated in the accompanying drawings. Wherever possible, the same reference characters will be used throughout the drawings to refer to the same or like parts.

The opener assembly of the invention can be used in conjunction with any type of drill system having shanks or a similar mounting device for the ground engaging tools. The opener assembly of the present invention is versatile and flexible in its application because it can be used either on ground that has been tilled or on ground that has not been tilled. While there are several criteria that go into the decision of whether or not to till prior to planting, one of the factors is the desired soil temperature into which the seed will be planted, i.e., tilled soil is warmer than soil that has not been tilled. In addition to having the capability to negotiate a wide range of soil conditions, the opener assembly of the invention can be used with both solid seeded and row crops.

Figure 1:
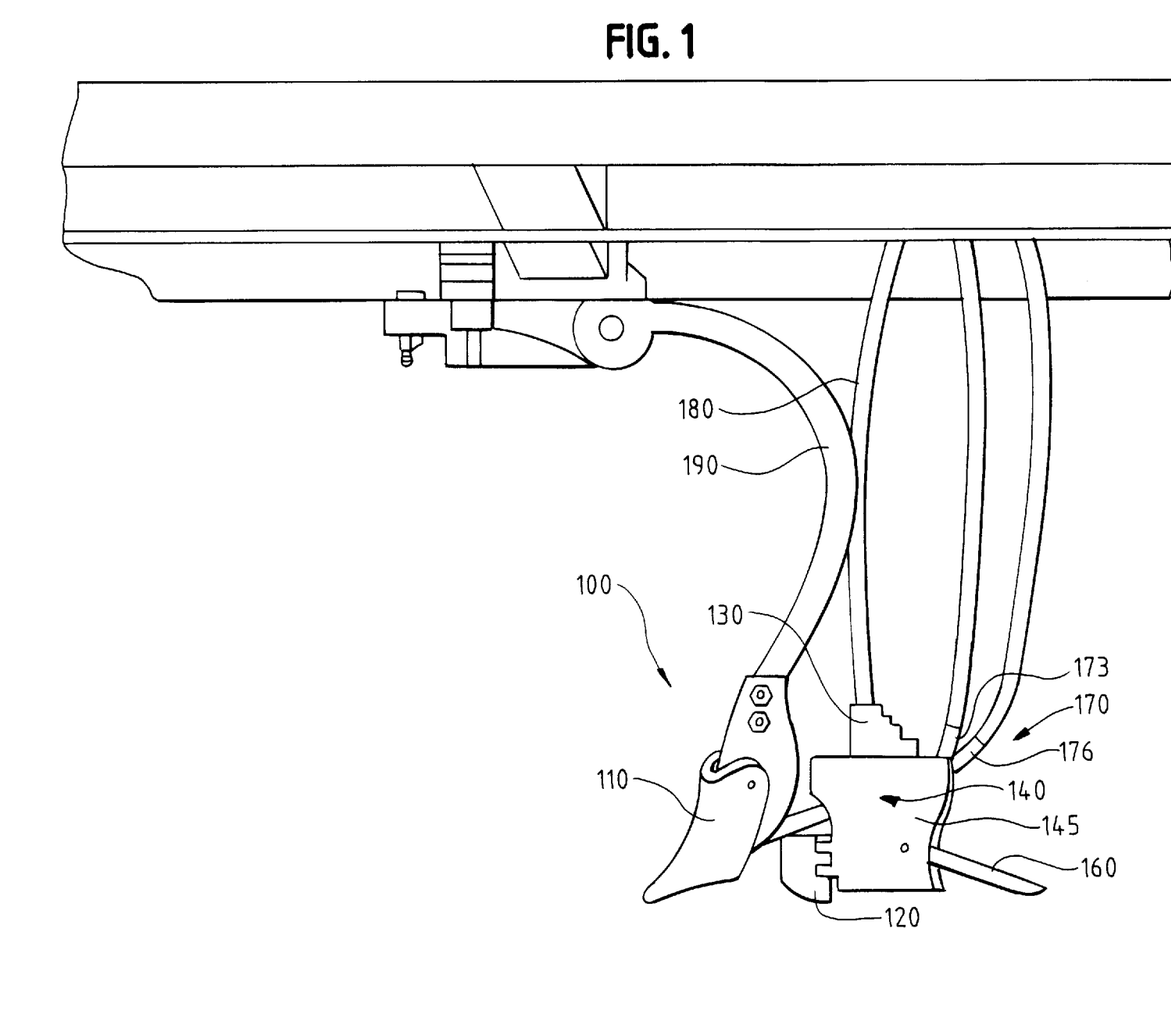
FIG. 1 is a partial perspective side view of a representative embodiment of an opener assembly of the present invention mounted to a drill system frame.

An exemplary embodiment of the opener assembly of the present invention is shown in FIG. 1 and designated generally by reference character 100. FIG. 1 shows the opener assembly 100 as it would be mounted on a shank 190 of a drill system. Although the drill system generally will include multiple opener assemblies 100 mounted on multiple shanks 190 that are attached to the frame of the drill system, only one such configuration is depicted in FIG. 1 for purpose of convenience and clarity. The drill system can be configured to have as many opener assemblies 100 as are needed to form the desired number of planting rows. Further, the distance by which the planting rows are to be separated from each other is varied by adjusting the spacing between the shanks 190 and, consequently, the opener assemblies 100. For example, row crops such as corn, sunflower and soybean are typically planted into rows that are spaced at least fifteen inches apart, whereas grain crops such as wheat and other cereals are typically planted in a solid seeding or ribbon pattern in rows that are spaced less than fifteen inches apart.

The opener assembly 100 of the invention is configured to be attached to a seed distribution system. The opener assembly 100 and seed distribution system are conveyed as part of the drill system across an area of ground as part of the drill system by an off-road vehicle, such as a tractor. The seed distribution system is comprised of a storage hopper or other container for carrying the supply of seed to be planted as is known. The seed distribution system further has a network of feed lines that permit distribution of the desired flow rate of seed to each of the opener assemblies 100 mounted on the drill system. Flow meters and seed sensors are incorporated into the feed line network at appropriate locations to monitor the rate that seed is fed to the opener assemblies 100. At the end of the feed line network are connection lines 180 that are the individual connector to each opener assembly 100. The connection line 180 can be comprised of a flexible hose, tube, or pipe material. The connection lines 180 must be flexible so as to accommodate different configurations of opener assemblies 100 mounted onto the frame of the drill system.

In accordance with one aspect of the invention, the opener assembly 100 includes a spike member 110, a seed boot 140 and a firming point 120. As shown in FIG. 1, for purpose of illustration, the spike member 110 is supported on a mounting device, such as a shank 190, by a bolt or other known mechanism. The spike member 110 is mounted on the shank 190 in such a way that when the drill system is operated, the spike member 110 is engaged with the ground so as to form a furrow or trench.

The opener assembly 100 can further comprise a seed sensor 130 that is in communication with the seed distribution system by the flexible connection line 180. The seed sensor 130 channels the flow of seeds into the trench formed by the spike member 110. The seed sensor 130 has an open lower distal end from which the seed is dispensed into the furrow. The open lower distal end is the portion of the seed sensor 130 that is closest to the furrow. Different crops have different sizes and shapes of seed. The seed sensor 130 and, in particular, its open lower distal end, must be designed so that the seed does not get hung up or bridge, resulting in the seed flow rate sharply dropping from the selected rate or stopping altogether. Further, the seed sensor 130 must be designed so as not to interfere or otherwise cause irregularities with the flow path of the seed. In the opener assembly 100, the seed sensor 130 is positioned at a height above the furrow that both permits the seed to be dispensed into the furrow without bouncing out and protects the seed sensor 130, particularly the open lower distal end, from being damaged by moving soil or debris. It is known that the closer the open lower distal end is to the furrow, thereby minimizing the distance the seed must travel from the seed sensor 130 to the furrow, the more accurate and consistent the placement of seed. Planting time and the supply of seed are best utilized when the desired seed flow rate is maintained with precision and without interruption.

Figure 2:
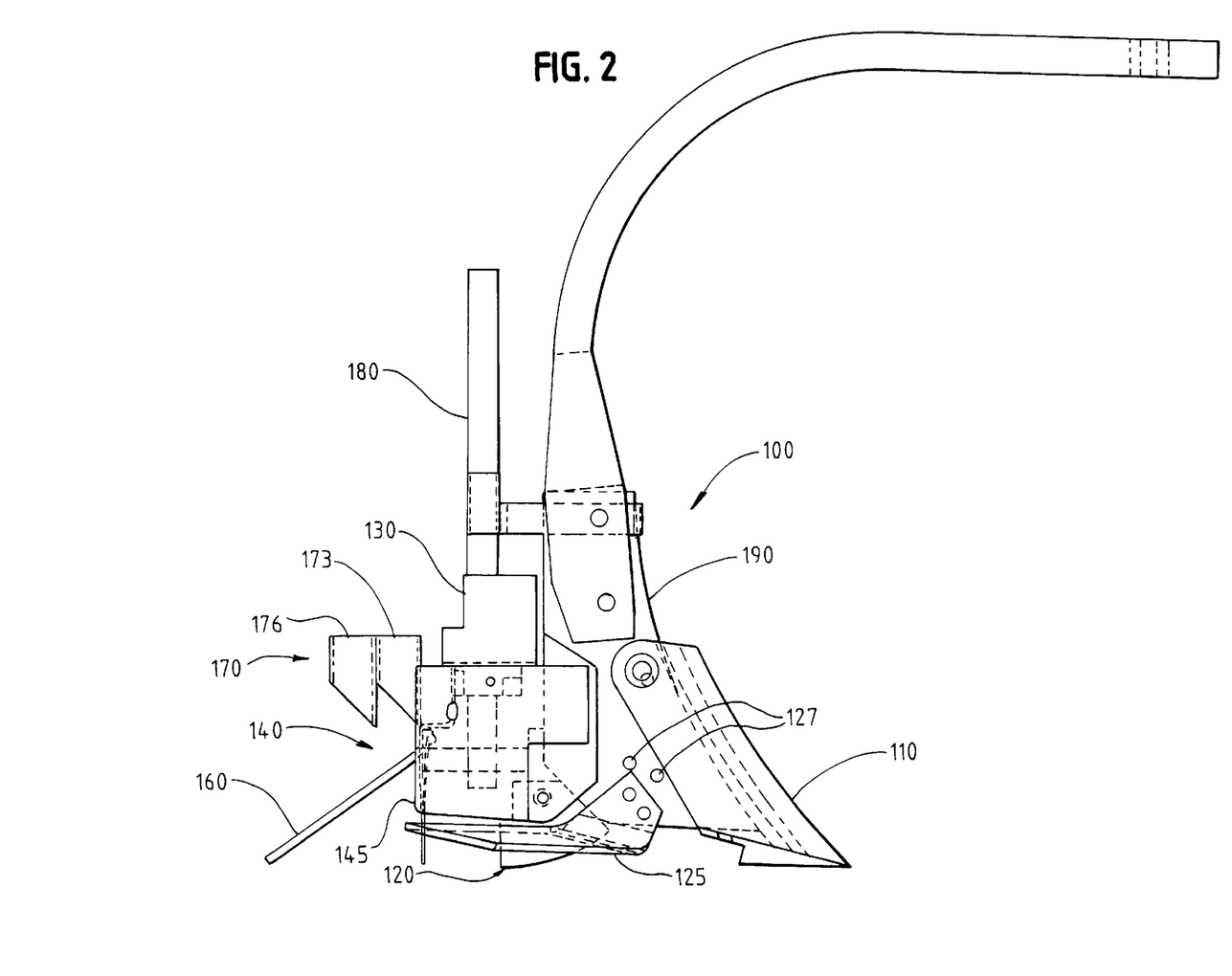
FIG. 2 is an enlarged perspective view of the opener assembly shown in FIG. 1.

As shown in FIGS. 1 and 2, in accordance with the invention, firming point 120 is positioned between the spike member 110 and the seed boot 140. The firming point 120 follows the rear portion of the spike member 110 through the furrow and maintains the shape of the furrow formed by the spike member 110. Soil may fall back into the furrow in the wake of the spike member 110, which may have an effect on the depth of the furrow. If the depth of the furrow is less than it was supposed to be, the seed will not be dispensed into the temperature, correct depth and composition of soil that was intended, with possible negative consequences for germination and growth. The firming point 120 maintains the desired furrow depth by loosely pushing the redeposited soil back against the side walls of the furrow. The firming point 120 also cleans out the furrow and creates a "V"-shaped furrow to improve seed to soil contact. The firming point 120 therefore is positioned between the spike member 110 and the seed boot 140 to optimize the soil environment within the furrow before seed is dispensed into the furrow.

Firming points 120 have been known for use with disc openers. Although firming points 120 have been used with disc openers, firming points 120 have not been used with spike members 110.

In accordance with the invention, the opener assembly 100 includes a seed boot 140 enclosing the seed sensor 130. As previously described, the accuracy and precision with which seed can be dispensed into the furrow by the seed sensor 130 is optimized when the open lower distal end of the seed sensor 130 is in close proximity to the furrow. Conventionally, a relatively substantial distance must be maintained between the open lower distal end and the furrow in order to protect the seed sensor from damage caused by the motion of the soil and the motion of field debris in the path of the drill system. The opener assembly 100 of the invention includes a seed boot 140 that shields the seed sensor 130 from soil set in motion by the spike member 110 and any debris that may be present in the field or the furrow. The protection afforded the seed sensor 130 by the seed boot 140 advantageously permits optimal seed dispensing into the furrow. The seed boot 140 encloses the seed sensor 130 in such a way that it does not interfere with the seed flow.

In the representative embodiment presented herein, the seed boot 140 includes a pair of lateral side walls 145. The lateral side walls 145 are joined together at the front of the seed sensor 130. The side walls 145 can be made of steel or another suitable material. The side walls 145 can have, but are not limited to having, a thickness of approximately ⅛" to approximately ¼". The front edge formed by the side walls 145 is generally blunt. In addition to protecting the seed sensor 130, the seed boot 140 can also support the firming point 120. In this manner, the firming point 120 is mounted to the seed boot 140 proximate the lateral side walls 145 being joined together. The firming point 120 is mounted to the seed boot 140 in such a way that it can perform its function within the furrow.

Seed sensors 130, which are known in the art, allow numerous benefits including early notification of a problem with the seed flow rate. If the operator of the drill system receives early notification that the seed flow has experienced either a dramatic increase or decrease, the problem can be quickly corrected. Like any monitoring device, seed sensors 130 can collect the best information by taking readings closest to the location for which monitoring is sought. The critical location in the seed dispensing process is where the seed exits the open lower distal end of the seed sensor 130. This point provides the most accurate picture of the flow rate, and hence pattern, of seed that actually ends up in the furrow. Conventionally, it is not possible to provide a seed sensor 130 near the furrow because seed sensors 130 are susceptible to damage from dirt and debris. However, by enclosing the seed sensor 130 within a seed boot 140, the seed sensor 130 of the invention can be provided closer to the furrow. While the opener assembly 100 of the invention permits the seed sensor 130 to be located anywhere along the length of the seed boot 140, preferably the seed sensor 130 is screened by the lateral side walls 145 of the seed boot 140. Locating the seed sensor 130 within the seed boot 140 provides the most useful data for the operator.

If it is desirable to till the soil during the planting operation, one or more sweeps 125 can be mounted to the sides of the opener assembly 100 as depicted in FIG 2. Sweeps 125 can also be used for dispensing chemicals, fertilizer and other media into the furrow or the area surrounding the furrow. Sweeps 125 are available in various widths and shapes depending on the type of tillage necessary. The sweep 125 can be attached to the opener assembly 100 by bolts or another similar device so that it can be easily removed if tillage of the soil is not necessary. In order to maintain the furrow for seed placement, the sweep 125 is positioned so that the bottom edge of the sweep 125 is located slightly above the firming point 120. The height of the sweep 125 can also be indexed to the bottom of the spike member 110. In a preferred embodiment, the sweep 125 is mounted between the spike member 110 and the seed boot 140 of the opener assembly 100 on the shank 190. A series of vertical holes 127 can be provided in the shank 190 for mounting the sweep 125 at various heights in relation to the firming point 120 or the spike member 110 depending on the desired depth of tillage.

The opener assembly 100 of the invention can further include a seed locking mechanism 160. The seed locking mechanism 160 is fastened by a bolt or another device to the rear of the seed boot 140. The locking mechanism 160 passes through the furrow after the seed has been dispensed to the furrow through the open lower distal end of the seed sensor 130. The seed locking mechanism 160 is a primarily flat, "finger-like" extension, that has a concave undersurface. The seed locking mechanism 160 is made of plastic or another suitable material. The dimensions of the seed locking mechanism 160 are those known in the art. The seed locking mechanism 160 urges a layer of soil over the seeds. The height at which the seed locking mechanism 160 is fastened to the seed boot 140 can be altered to provide variable amounts of soil cover to the seed. By covering the seeds with a layer of soil, the seeds are separated from any assistive media that may be applied to the furrow at the same time as seeding. In addition, the seed locking mechanism 160 pushes the seed into the bottom of the "V"-shaped furrow to increase the seed to soil contact. By moving the soil, the seed locking mechanism 160 also collapses the furrow.

Assistive media include, but are not limited to fertilizers, micronutrients, pesticides, and fungicides. Efficiency is achieved by applying fertilizers and the like at the same time that a field is planted. While the purpose of assistive media is to promote growth by either providing nutrition, reducing competition, or preventing disease, seed can be harmed if exposed directly to the media. For example, corn seed can be "burned" by being in direct contact with fertilizer. Conversely, if assistive media are applied to the field after planting, there is a relatively large separation between the seed and the media and either the seed is exposed to a less than optimal amount of the media or the media must be over-applied. In either situation the effective amount of the assistive media is diluted throughout the soil surrounding the seed. The seed locking mechanism 160 improves the efficiency of the drill system operation by permitting assistive media to be effectively applied at the same time as planting.

The efficiency of the opener assembly 100 of the invention is further improved by providing at least one media delivery tube 173. The media delivery tube 173 is configured to transport either dry or liquid assistive media to the furrow. The media delivery tube 173 is in communication with a storage bin that is conveyed with the seed distribution system across an area of ground by the off-road vehicle moving the entire drill system. The media delivery tube 173 is fastened to the seed boot 140 in such a way that it is directed to dispense the assistive media into the furrow subsequent to the seed locking mechanism 160 covering the seed with soil. However, if the opener assembly 100 does not include a seed locking mechanism 160, the media delivery tube 173 is positioned on the seed boot 140 so as to dispense assistive media subsequent to seeding. The media delivery tube 173 can be fastened to the seed boot 140 by a conventional fastener, such as a collar-bolt arrangement or the like. As with the seed sensor 130, the media delivery tube 173 is protected from moving soil and debris by the lateral side walls 145 of the seed boot 140.

In a preferred embodiment, the opener assembly 100 of the invention includes a plurality of media delivery tubes, 173 and 176. For example, and as shown in FIGS. 1 and 2, a pair 170 of media delivery tubes may be provided. The media delivery tubes, 173 and 176, are fastened to the seed boot 140 of the opener assembly 100 by a conventional fastener, such as a collar-bolt arrangement or the like. The pair 170 of media delivery tubes, 173 and 176, permits application of two assistive media in the same pass with seeding. Thus, a liquid and a particulate media, though they cannot be stored in a storage bin together, can be applied to the furrow in the same pass. The pair 170 of media delivery tubes, 173 and 176, are fastened to the seed boot 140 so as to dispense media into the furrow after the seed has been dispensed into the furrow via the seed sensor 130. Further, if the opener assembly 100 includes a seed locking mechanism 160, the pair 170 of media delivery tubes, 173 and 176, are oriented on the seed boot 140 to dispense media after the seed locking mechanism 160 urges a layer of soil on top of the seed. In addition to the media having different phases, there may be other reasons why the assistive media can not be blended and dispensed through a single media delivery tube 173. For example, the assistive media may be chemically incompatible or may create an unstable mixture. The multi-media delivery system thus described provides increased efficiency by permitting the simultaneous application of more than one assistive media in the same pass as seeding.

FIG. 2 depicts an enlarged view of the opener assembly 100 shown in FIG. 1. Although all the features described above are shown in combination, it is not necessary to include each and every feature in a single embodiment. For example, and in accordance with the present invention, the opener assembly 100 of the invention may include a spike member 110, a seed sensor 130, and a seed boot 140. The spike member 110 is supported on a mounting device that is part of the frame of the drill system. The drill system is conveyed by an off-road vehicle and is engaged with the ground so as to form a furrow therein. The mounting device may include a shank 190. The spike member 110 may be supported by bolts or another known mechanism of mounting a ground engaging tool to a shank 190. The spike member 110 is shaped to form a furrow through the soil when the drill system moves across the ground. The seed sensor 130 is in communication with the seed distribution system that provides a desired flow rate of seed through the seed boot 140. The seed is dispensed through the seed boot 140 into the furrow formed by the spike member 110 through the open lower distal end of the seed sensor 130. The seed boot 140 encloses the open lower distal end of the seed sensor 130 to increase the accuracy with which the seed reaches the furrow and to protect the seed sensor 130 from damage that may be caused by the moving soil or debris. The seed boot 140 can be fabricated of steel or another suitable material and is shaped to provide the desired protection without any interference with the dispensing of seed to the furrow.

The opener assembly 100 may further comprise a firming point 120 to improve the seed environment within the furrow formed by the spike member 110. The firming point 120 is mounted to the seed boot 140 by a conventional fastener, such as a bolt or the like, between the spike member 110 and the seed sensor 130. The opener assembly 100 may also include one or more sweeps 125 if it is desirable to till the soil during the planting operation. The sweep 125 can also be used to dispense chemicals, fertilizer and other media to the furrow or the area surrounding the furrow. The sweep 125 is removably mounted to the shank 190, on either side of the opener assembly 100, typically between the spike member 110 and the seed boot 140. The shank 190 may have a series of vertical holes 127 for mounting the sweep 125 so that the sweep 125 can be mounted at more than one height in relation to the other components of the opener assembly 100. In addition to the firming point 120 and the sweep 125, the opener assembly 100 may include a seed locking mechanism 160 that is fastened by a conventional fastener, such as a bolt or the like, to the portion of the seed boot 140 posterior to the seed sensor 130. One purpose of the seed locking mechanism 160 is to urge a layer of soil over the seed dispensed into the furrow so that there is a soil layer of separation between the seed and any assistive media that may be applied to the open furrow. In order to apply the assistive media, the opener assembly 100 may include at least one media delivery tube 173 or a plurality of media delivery tubes, 173 and 176. The media delivery tube 173 is fastened to the seed boot 140 by a conventional fastener, such as a bolt or the like. The media delivery tube 173 is fastened to the seed boot 140 so that assistive media is dispensed from the tube 173 into the furrow after the seed locking mechanism 160 has passed through the furrow and partially covered the seed with soil. However, if it is not harmful to have the assistive media in direct contact with the seed, the seed locking mechanism 160 may not be necessary and the media can be dispensed into the furrow directly after the seed. The seed boot 140 protects the seed sensor 130 from soil and debris that may interfere with the proper function of the seed sensor 130.

Furthermore, an alternative embodiment may include the combination of a spike member 110, a seed boot 140, a seed sensor 130, a seed locking mechanism 160 and a multi media delivery tube assembly 170. The seed sensor 130 is connected to a seed distribution system by a flexible connector 180. The combination of this embodiment is understood from the description provided above. The opener assembly 100 of the invention can be used to seed fields that have been tilled or that have not been tilled. Shank mounted ground engaging tools are able to handle more mud, handle more trash flow, and require less maintenance than disc openers.

Figure 3:
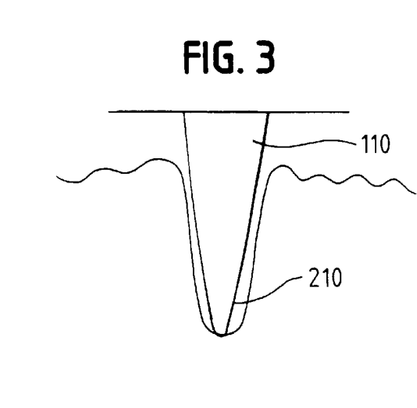
FIG. 3 through FIG. 7 are a series of cross-sectional rear views sequentially depicting the soil as the opener assembly of the invention is pulled therethrough, with each figure showing respectively the individual functions of the opener assembly components.

In order to illustrate the function of the opener assembly 100 of the invention, FIGS. 3–7 depict the various portions of the opener assembly as the portions form and pass through a furrow 210. In FIG. 3, the spike member 110 is pulled through the ground by the forward motion of the drill system which is conveyed across an area of ground by an off-road vehicle. The spike member 110 is mounted to the shank 190 by a conventional fastener such as a bolt or the like. The spike member 110 and shank 190 are conveyed by the off-road vehicle for engagement with the ground so as to form a furrow therein. As previously described, the drill system includes a series of shanks 190 that are fixed to the frame of the drill system. An opener assembly 100 is mounted on each shank 190 that is in use. The height of the shanks 190 can be adjusted using a hydraulic or other system known in the art. The shanks 190 are lowered toward the ground or raised away depending on whether the drill system is in operation or not. The number of shanks 190, and consequently the number of opener assemblies 100, is selected depending on the number of rows that are to be formed and seeded in one pass of the drill system. The spacing between the shanks is adjusted depending on the type of crop that is being planted. Row crops require rows spaced approximately 15 inches apart or more while cereal crops are planted into rows that spaced less than 15 inches apart. Though preferably connected to a common seed distribution system and a common assistive media distribution system, each opener assembly 100 operates independently. The spike member 110 is appropriately selected from any of a variety of known configurations depending on the soil and seed conditions. The front end of the spike member 110 is pointed and blade-like to form a furrow 210 in the soil when the shanks 190 are lowered and the opener assembly 100 engages the ground in the operation of the drill system.

Figure 4:
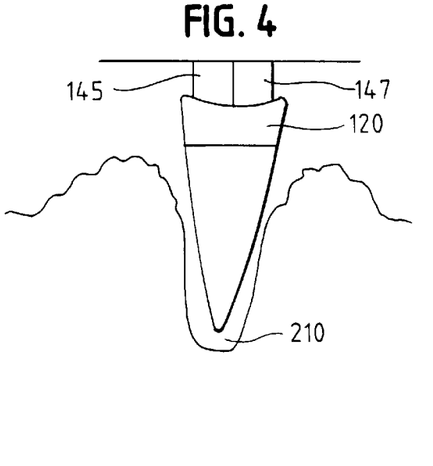

The opener assembly 100 can further comprise a firming point 120 that is mounted to the seed boot 140 between the spike member 110 and the seed sensor 130. The firming point 120 maintains the desired depth of the furrow 210 by pushing away any soil that falls back into the furrow in the wake of the spike member 110. The firming point 120 also clears a "V"-shaped furrow 210 that improves seed to soil contact. A rear view of the position of the firming point 120 in the furrow 210 is depicted in FIG. 4. If it is desirable to till the soil during the planting operation, one or more sweeps 125 can be removably mounted to the sides of the opener assembly 100. Typically, the sweep 125 is mounted on the shank 190 between the spike member 110 and the seed boot 140. Preferably, the bottom edge of the sweep 125 is located slightly above the firming point 120 in order to maintain the furrow for seed placement.

Figure 5:
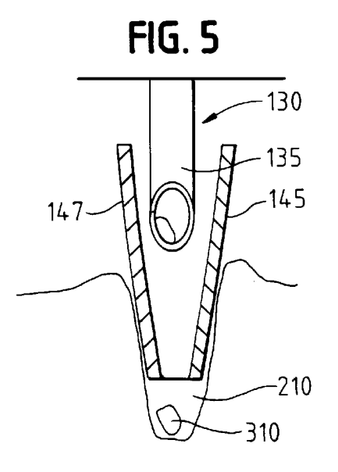

After the firming point 120 passes through the furrow 210 to improve the seed environment, the seed sensor 130 passes over the top of the furrow 210. As shown in FIG. 5, the seed sensor 130 has an open lower distal end 135 from which seed 310 is dispensed into the furrow 210. The seed boot 140 to which the firming point 120 is mounted is visible in FIG. 5. The seed boot 140 can include a pair of lateral side walls, 145 and 147. The front ends of the lateral side walls, 145 and 147, are joined together to form the front end of the seed boot 140. The seed boot 140 encloses the seed sensor 130. FIG. 5 depicts a rear end view of seed 310 being dispensed into the furrow 210 through the open lower distal end 135 of the seed sensor 130. The seed sensor 130 is designed to insure the free flow of seed 310 at the rate desired for optimal planting. The seed 310 rests on the bottom of the furrow 210 and the spacing between seeds 310 is a function of the flow rate set for the seed distribution system. Seed 310 can be dispensed in different patterns depending on the type of crop.

Figure 6:
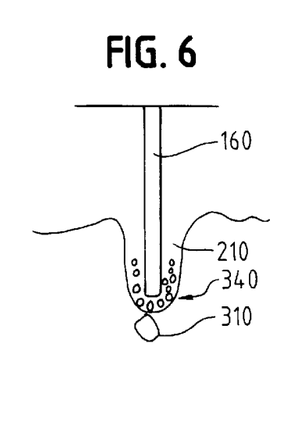

After the seed 310 is dispensed to the furrow 210, the seed locking mechanism 160 is pulled through the furrow 210. The seed locking mechanism 160 is fastened to the rear portion of the seed boot 140 so as to follow the seed sensor 130. The action of the seed locking mechanism 160 in the furrow 210 is shown in FIG. 6. The seed locking mechanism 160 urges an amount of soil from the sides of the furrow 210 to form a layer of soil over the seed 310. The seed 310 is then covered with a loose layer of soil 340. The layer of soil 340 acts as a buffer between the seed 310 and any assistive media that are also dispensed into the furrow 210. Additionally, the seed locking mechanism 160 pushes the seed 310 into the bottom of the "V"-shaped furrow 210 to increase seed to soil contact. Further, the seed locking mechanism 160 collapses the furrow 210.

Figure 7:
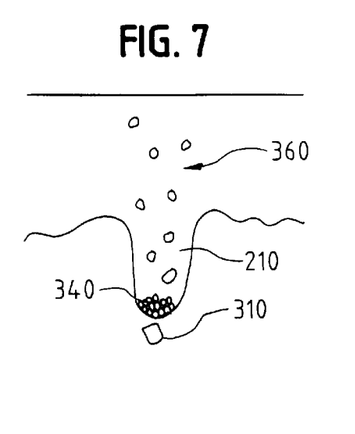

The multi-media delivery tube assembly 170 of the opener assembly 100 includes at least two media delivery tubes, 173 and 176. The multi media delivery tube assembly 170 is fastened to the seed boot 140 in such a way that it is capable of distributing a particulate assistive medium to the furrow 210 subsequent to the seed locking mechanism 160 covering the seed 310 with soil 340. FIG. 7 shows a dry particulate medium 360 being dispensed into the furrow 210. The particulate medium 360 performs some assistive function to the germination of the seed 310 or the growth of the resulting plant. While beneficial, some assistive media 360 are harmful when in direct contact with the seed 310. The soil layer 340 protects the seed 310 from being in direct contact with the particulate medium 360. However, the opener assembly 100 of the invention permits safe introduction of the assistive medium directly to the furrow 210 in the same pass that seeding occurs.

It will be apparent to those skilled in the art that various modifications and variations can be made in the design and construction of the opener assembly without departing from the scope or spirit of the invention.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A ground opener assembly attachable to a mounting device and connectable to a seed distribution system that is conveyed by an off road vehicle comprising:

a downwardly-pointing spike member attachable to said mounting device conveyed by said vehicle for engagement with the ground so as to form a furrow therein;

a seed sensor in communication with said seed distribution system through which seed is dispensed into said furrow;

a seed boot enclosing said seed sensor; and a firming point positioned between said spike member and said seed boot.

2. The opener assembly of claim 1 wherein said seed boot comprises a first lateral side wall located adjacent one side of said seed sensor and a second lateral side wall located adjacent an other side of said seed sensor.

3. The opener assembly of claim 2 wherein the firming point is mounted to said seed boot.

4. The opener assembly of claim 2 wherein said seed sensor is positioned between said first and said second lateral side walls of said seed boot.

5. The opener assembly of claim 1 further comprising a seed locking mechanism attached to said seed boot to push said seed into said furrow and to urge a layer of soil over said seed dispensed into said furrow.

6. The opener assembly of claim 1 further comprising at least one media delivery tube integral with said seed boot, said at least one media delivery tube in communication with at least one storage container carried on said off-road vehicle.

7. The opener assembly of claim 1 further comprising at least two media delivery tubes integral with said seed boot, said at least two media delivery tubes in communication with at least two storage containers carried on said off-road vehicle.

8. The opener assembly of claim 7 wherein said media delivery tubes dispense particulates from said storage containers conveyed by said off-road vehicle.

9. The opener assembly of claim 1 further comprising at least one sweep mounted between said spike member and said seed boot.

10. The opener assembly of claim 9 wherein said sweep can be mounted between said spike member and said seed boot at more than one height.

11. A ground opener assembly attachable to a mounting device and connectable to a seed distribution system that is conveyed by an off road vehicle comprising:

a downwardly pointing spike member attachable to said mounting device conveyed by said vehicle for engagement with the ground so as to form a furrow therein;

a seed sensor in communication with said seed distribution system, said seed sensor having an open lower distal end from which seed is dispensed into said furrow; and a seed boot enclosing said open lower distal end of said seed sensor.

12. The opener assembly of claim 11 further comprising a firming point mounted to said seed boot between said spike member and said seed sensor.

13. The opener assembly of claim 11 further comprising at least one sweep mounted between said spike member and said seed boot.

14. The opener assembly of claim 11 further comprising a seed locking mechanism attached to said seed boot to push said seed into said furrow and to urge a layer of soil over said seed dispensed into said furrow.

15. The opener assembly of claim 11 further comprising at least one media delivery tube integral with said seed boot, said at least one media delivery tube in communication with at least one storage container carried on said off-road vehicle.

16. A ground opener assembly attachable to a mounting device and connectable to a seed distribution system that is conveyed by an off road vehicle comprising:

a spike member attachable to said mounting device conveyed by said vehicle for engagement with the ground so as to form a furrow therein;

a seed sensor in communication with said seed distribution system to dispense seed into said furrow;

a seed boot enclosing said seed sensor;

a seed locking mechanism attached to said seed boot to push said seed into said furrow and to urge a layer of soil over said seed dispensed into said furrow; and at least one media delivery tube positioned so as to trail said seed locking mechanism on said seed boot, said at least one media delivery tube in communication with at least one storage container carried on said off-road vehicle.

17. The opener assembly of claim 16 wherein said seed boot comprises a first lateral side wall located adjacent one side of said seed sensor and a second lateral side wall located adjacent an other side of said seed sensor.

18. The opener assembly of claim 16 wherein said seed sensor has an open lower distal end from which said seed is dispensed.

19. The opener assembly of claim 16 further comprising a firming point mounted on the seed boot between said spike member and said seed sensor.

20. The opener assembly of claim 16 further comprising at least one sweep mounted between said spike member and said seed boot.

* * * * *